United States Patent [19]

Wible

[11] Patent Number: 4,918,607

[45] Date of Patent: Apr. 17, 1990

[54] VEHICLE GUIDANCE SYSTEM

[75] Inventor: John E. Wible, Plainesville, Ohio

[73] Assignee: Caterpillar Industrial Inc., Mentor, Ohio

[21] Appl. No.: 242,241

[22] Filed: Sep. 9, 1988

[51] Int. Cl.4 .......................... G06F 15/50; B62D 1/00
[52] U.S. Cl. ................................ 364/424.02; 364/457; 364/449; 364/443; 180/169
[58] Field of Search ...................... 364/424.02, 424.07, 364/443, 449, 457; 180/167, 169; 250/561, 563

[56] References Cited

U.S. PATENT DOCUMENTS

| 4,114,711 | 9/1978 | Wilkins | 180/6.5 |
| 4,488,233 | 12/1984 | Tsumura | 364/424 |
| 4,647,784 | 3/1987 | Stephens | 250/561 |
| 4,703,820 | 11/1987 | Reinaud | 180/169 |
| 4,790,402 | 12/1988 | Field et al. | 364/424.02 |
| 4,811,228 | 3/1989 | Hyyppä | 180/169 |
| 4,816,998 | 3/1989 | Ahlbom | 364/449 |

FOREIGN PATENT DOCUMENTS 2535068 4/1984 France .
2159015A 11/1985 United Kingdom .

Primary Examiner—Parshotam S. Lall
Assistant Examiner—V. Trans
Attorney, Agent, or Firm—Alan I. Hickman

[57] ABSTRACT

A navigation system for use in a self guided material handling vehicle provides guidance during operation in areas having densely stacked rows of containers and reduces the potential of deviation of the self guided vehicle from the desired path of travel. A laser signaling device is mounted on the vehicle and rotatable about an axis of rotation extending generally perpendicularly to the longitudinal axis of the self guided vehicle. The laser signaling device is adapted to delivery a light beam signal at a first preselected angle relative to the axis of rotation and a directing device is provided for directing the delivered light beam signal, during a preselected portion of rotation of the laser signaling device, at a second different preselected angle relative to the axis of rotation. A receiving device receives a reflection of the light beam signal and delivers a position signal in response to the light beam signal received. The navigation system is particularly suited for use in automatic storage and retrieval systems.

18 Claims, 2 Drawing Sheets

VEHICLE GUIDANCE SYSTEM

TECHNICAL FIELD

This invention relates to a vehicle guidance system having a rotatable laser signaling device and more particularly to a self guided vehicle having a rotatable laser signaling device which delivers a light signal at first angle and a directing device for directing the light signal at a second angle during a preselected portion of rotation of the laser signaling device.

BACKGROUND ART

The recent advancements in automatic guided vehicle technology has resulted in vehicles which are capable traversing the floor of a warehouse, machine shop and the like without the need for a fixed floor mounted guidepath such as; guidance wires, stripes and the like. Automatic guided vehicles of this type are referred to by some as self guided vehicles (SGV). These vehicles are equipped with a programmable onboard computer which guides the vehicle in accordance with preprogrammed instructions and information provided to the computer by onboard sensors such as, wheel rotation and steer angle transducers, and the like. These sensors feedback information to the onboard computer which represents the actual operating conditions of the vehicle and enables the vehicle to perform to a limited degree, what is referred to as dead-reckoning. Dead-reckoning is the ability of the vehicle to continue to operate (travel) over a preprogrammed path without receiving any external input information for vehicle navigation purposes. During operation of the vehicle, conditions such as; wheel slip, tire wear, steering error and the like may exist which can affect the accuracy of the information provided by the sensors to the onboard computer. Therefore, in the long term, the vehicle will unknowingly deviate from the actual desired path of travel.

Vehicle navigation systems for SGV's have been provided to identify the actual location of the vehicle within the area of operation and deliver this information to the onboard computer so that the path of travel associated with dead-reckoning can be compared with the actual vehicle location and adjustments made to the vehicle position. The navigation system includes a laser scanner mounted on the vehicle. An example of an SGV having a laser scanner is disclosed in U.S. Pat. No. 4,647,784, dated Mar. 3, 1987, to Philip E. Stephens. The laser scanner delivers a light signal in essentially a horizontal sweeping plane and receives a reflection of the signal from targets located within the area of operation. The targets are located at preselected spaced apart distances within the area and at substantially equal heights from the surface so that the signal from the laser scanner can be reflected therefrom when in range. The laser scanner receives these signals and communicates with the onboard computer. The computer calculates the actual location of the using the method of triangulation, compares the actual location with the dead-reckoning position and maneuvers the vehicle to correct for this error. In normal circumstances the accuracy of vehicle position is extremely high. However, when the laser scanner is unable to read the targets due to obstructions in the path of the light beam, the vehicle guidance system, over long durations of time, will not be adequate to maintain the vehicle within acceptable tolerances along the desired path for the reasons discussed above.

In applications wherein rows of densely stacked boxes, cartons, and the like are present, the laser navigation signals have a high potential of being blocked. In such applications there is a need to enable the SGV to periodically verify its true location, in addition to the guidance signals associated with dead-reckoning, to insure that the SGV is located within acceptable tolerances of the desired path. Preferably, this can be achieved in an economical and efficient manner and without the need of complex devices.

The present invention is directed to overcoming one or more of the problems as set forth above.

DISCLOSURE OF THE INVENTION

In one aspect of an embodiment of the present invention, a self guided vehicle having a frame, and a longitudinal axis, is provided. A laser signaling device is mounted on the frame, rotatable about an axis of rotation extending generally perpendicularly to the longitudinal axis, and adapted to deliver a light beam signal at a first preselected angle relative to the axis of rotation. A directing device is provided for directing the delivered light beam signal, during a preselected portion of the rotation, at a second different preselected angle relative to the axis of rotation, and a receiving device receives a reflection of the light beam signals.

In another aspect of an embodiment of the present invention, a navigation system for a self guided vehicle, having a frame, and a longitudinal axis, is provided. A laser signaling device is mounted on the vehicle frame at a preselected elevational position and rotatable about an axis of rotation extending generally perpendicularly to the longitudinal axis and is adapted to deliver a light beam signal at a first preselected angle relative to the axis of rotation. A directing device directs the delivered light beam signal, during a preselected portion of rotation of the laser signaling device, at a second different preselected angle relative to the axis of rotation. A plurality of first targets positioned at preselected spaced apart locations within a self guided vehicle operating area are adapted to deliver a reflection the light beam signal delivered at the first preselected angle, and a plurality of second targets positioned at preselected spaced apart locations from each other and from the first targets are adapted to deliver a reflection of the light beam signal directed at the second angle. A receiving device receives the reflections of the light beam signals delivered at the first and second angles and delivers a position signal in response to receiving one of the reflections, and a computer receives the position signal and controls navigation of the self guided vehicle in response to preprogrammed instructions.

In yet another aspect of an embodiment of the present invention, an automatic storage/retrieval system having a self guided vehicle and at least two spaced apart rows of densely stacked containers defining an aisle therebetween is provided. The self guided vehicle has a frame, a longitudinal axis, and a load carrying apparatus mounted on the frame and adapted to elevationally move selective ones of the containers. The self guided vehicle is supported on and moveable along an underlying surface, and a laser signaling device is mounted on the vehicle frame and rotatable about an axis of rotation extending generally perpendicularly to the longitudinal axis. The laser signaling device is adapted to deliver a light beam signal at a first preselected angle relative to the axis of rotation and at a first preselected vertical distance from the underlying surface. A directing device directs the delivered light beam signal, during a preselected portion of the rotation, at a second different preselected angle relative to the axis of rotation. A plurality of first targets positioned at preselected spaced apart locations and at a second preselected vertical distance from the underlying surface are adapted to deliver a reflection of the light beam signal delivered at the first preselected angle. A plurality of second targets positioned at preselected spaced apart locations and at a third preselected vertical distance from the underlying surface are adapted to deliver a reflection of the light beam signal directed at the second angle. The third vertical distance is greater in magnitude than the first and second vertical distances and the second targets are spaced from the first targets. A reflection receiving device receives the reflections of the light beam signals delivered at the first and second angles and delivers a position signal in response to receiving one of the reflections and a position signal receiving device receives the position signal and controls navigation of the self guided vehicle in response to preprogrammed instructions.

BEST MODE FOR CARRYING OUT THE INVENTION

Figure 1:
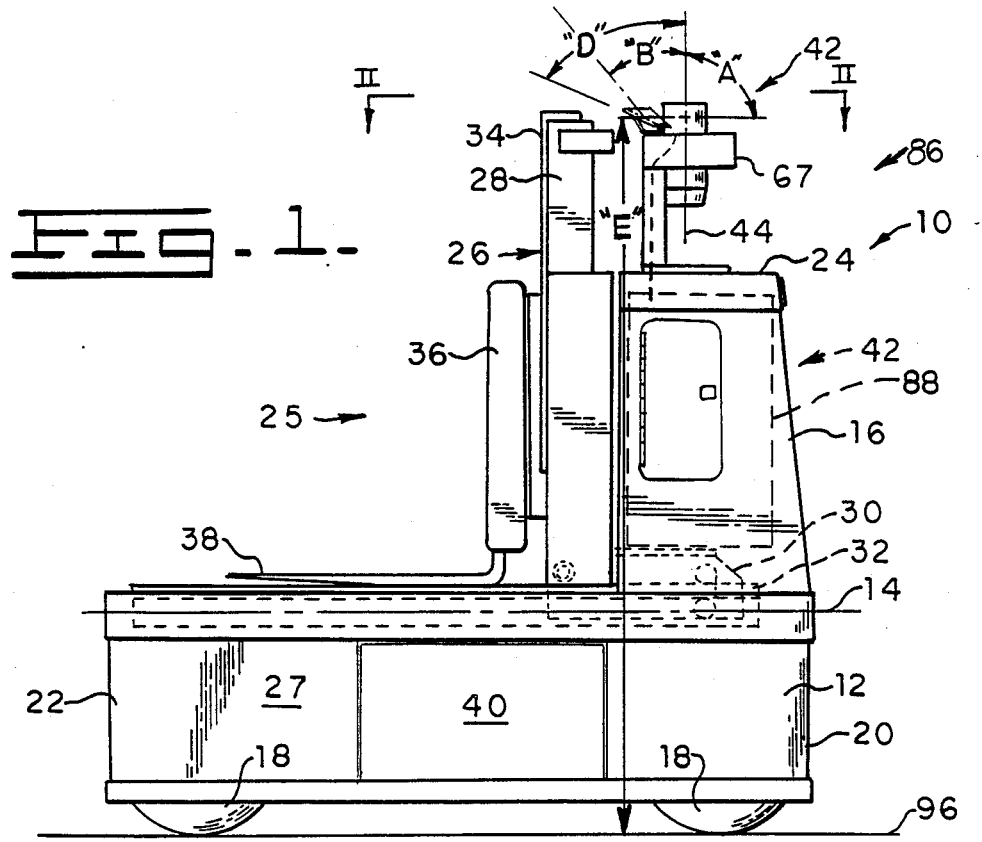
FIG. 1 is a diagrammatic side elevational view of an embodiment of the present invention showing a self guided vehicle having a frame, a laser signaling and receiving device mounted on the frame, a lift mast assembly mounted on the frame and movable longitudinally and elevationally relative to a longitudinal axis of the vehicle, and a means for directing a signal delivered from the laser signaling device.
Figure 2:
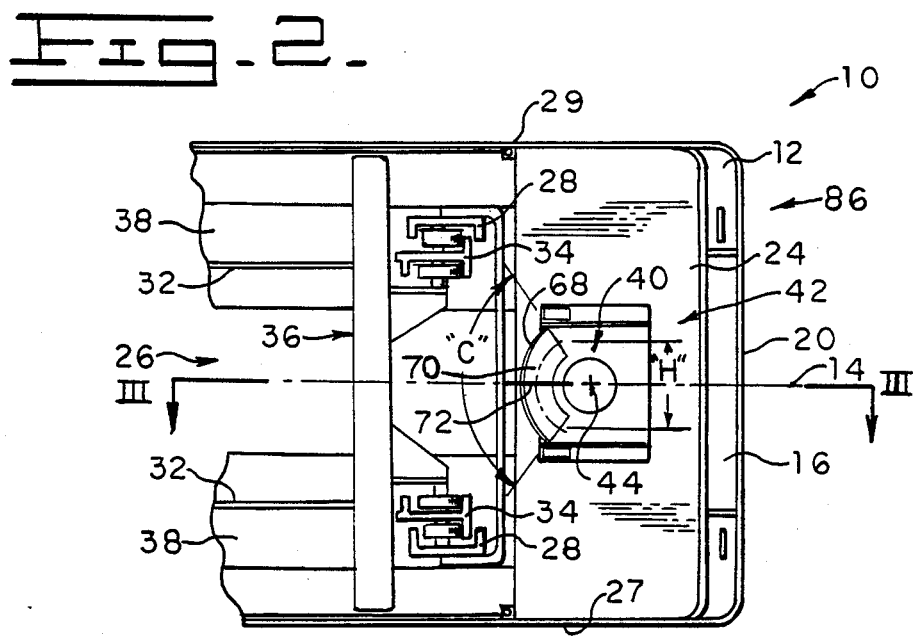
FIG. 2 is a diagrammatic partial top plan view of the embodiment of FIG. 1 taken along the lines II—II of FIG. 1.

With reference to the drawings, and particularly FIGS. 1 and 2, a material handling vehicle 10, for example a self-guided vehicle (SGV), has a frame 12, a longitudinal axis 14, a tower portion 16 and a plurality of ground engaging wheels 18 which are rotatably connected to the frame 12 is provided. The vehicle 10 has front and rear spaced end portion 20, 22 and the tower 16 is mounted at the front end portion 20 of the frame and extends upwardly therefrom. The tower 16 has an upper surface portion 24 which is a preselected height from the wheels 18 at the location of engagement between the wheels 18 and the underlying surface upon which the vehicle 10 operates.

A load carrying apparatus 25, such as a lift mast assembly 26, but not limited thereto, is mounted on the frame 12 within an area on the frame 12 substantially between first and second spaced apart sides 27,29 of the vehicle. The lift mast assembly 26 is longitudinally movable in directions along axis 14 and relative to the vehicle frame 12 between a first position at which the lift mast assembly 26 is adjacent the tower portion 16 and a second position at which the lift mast assembly 26 is adjacent the rear end portion 22 of the vehicle. The lift mast assembly 26 has a pair of elevationally oriented spaced apart outer uprights 28 which are mounted on an undercarriage 30 which is mounted on longitudinally oriented guide rails 32 and a pair of spaced apart inner uprights 34 which are nested between the outer pair of uprights 28 and elevationally guided for movement along and by the outer uprights 28 in an elevational direction substantially normal to the longitudinal axis 14. A carriage assembly 36 has a pair of load engaging forks 38 mounted thereon. The carriage assembly 36 is connected to the inner uprights 34 and elevationally movable along the inner uprights 34 between spaced apart locations relative thereto. Because the lift mast assembly 26 is of a well known construction to those in the field of material handling, the operation and construction thereof will not be discussed in any greater detail.

The SGV 10 has a source of electrical energy 40 such as a battery which provides motive power for the drive motor (not shown) of the vehicle 10, the lift mast assembly 26, and other systems of the vehicle 10 requiring electrical power. A vehicle navigation system 86 includes a laser signaling device 42 which is mounted on the frame 12 and rotatable about an axis of rotation 44 which extends in a direction generally perpendicular to the longitudinal axis 14. The laser signaling device 42 is adapted to deliver a light beam signal at a first preselected angle "A" relative to the axis of rotation 44. The navigation system 86 also includes a directing means 46 for directing the delivered light beam signal at a second different preselected angle "B" relative to the axis of rotation 44 during a preselected portion of the rotation of said laser signaling device 42, and a receiving means 48 for receiving a reflection of the light beam signal and delivering a position signal in response to receiving the reflection.

Figure 3:
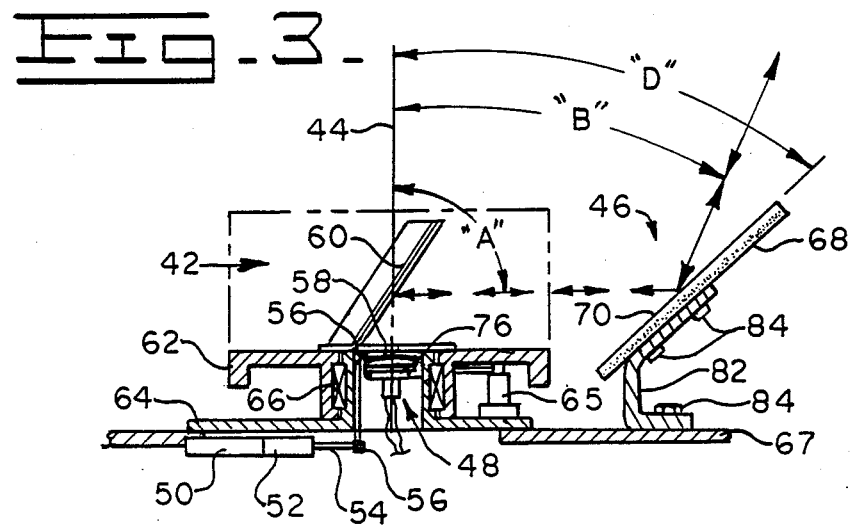
FIG. 3 is a diagrammatic partial 5 crossectional view of the laser signaling and receiving device and signal directing means of FIG. 1.

As best seen in FIG. 3 the laser signaling device 42 includes a light beam signal emitting source 50 which generates a very narrow beam of intense coherent light which is expanded into a parallel sided pencil-like beam 54 which is directed by a plurality of fixed serially sequenced mirrors to a lens 58 and directed thereby to a scanning mirror 60 and reflected thereby to previous mentioned angle "A". The scanning mirror 60 is adjacent the light beam emitting source and rotatably connected to the frame and rotatable about axis 44. Specifically, the scanning mirror is mounted on a disc 62 which is rotatably connected to a spindle 64 by a bearing assembly 66 of preferably the antifriction type, for example ball or roller bearings. The light beam emitting source 50, optical system 52, fixed mirrors 56, and lens 58 are preferably rigidly connected to the spindle 64. The spindle 64 is mounted on a carrier assembly 67 which is connected to the upper surface portion 24 of the tower 16. As best seen in FIG. 2, the axis 44 of the laser signaling device 42 is directly above the longitudinal vehicle axis 14 and intersects axis 14. Further, the inner and outer upright pairs 34, 28 are equally spaced from the longitudinal center line 14 so that the distribution of weight on the vehicle wheels is substantially equal. An electric drive motor 65 is mounted on the spindle 64, connected to the battery 40, and drivingly connected to the disk 62 in any suitable manner such as by belt, chain or gear mechanisms which are well known and of a conventional design.

The directing means 46 preferably includes a reflecting member 68 which is mounted on the frame at a location adjacent the laser signaling device 42 and in a path of the light beam signal at the first preselected angle "A". The reflecting member 68 directs (reflects) the delivered light beam signal at angle "A", at a second different preselected angle "B" relative to the axis of rotation 44, during a preselected portion of the rotation of the laser signaling device 42. Preferably, the reflecting member 68 has an arcuate surface 70 of a preselected average chordal length "H". The average chordal length "H" is determined as a function of the distance of the reflecting member from the axis 44 and the overall outside width of the lift mast assembly 26. In other words, the length of the arc of the reflecting member is determined by the dead band space defined by angle "C" (FIG. 2) which extends from the axis 44 tangent to the uprights 28. The arcuate surface of the laser signaling device 42 is radially spaced from the axis of rotation 44, and at a preselected angle "D" (FIG. 3) lying in a plane 72 of the axis of rotation 44 passing through said arcuate surface 72. The angle of inclination "D" of the reflecting member 68 is determined based on factors such as the range of the laser signaling device 42, the speed of the vehicle 10, the location of the hereinafter to be discussed second targets 74, and the distance of the second targets 74 from the underlying surface 96 upon which the vehicle 10 operates. It is to be noted that the lift mast assembly 26 would block the light beam signal delivered at the first preselected angle "A" when the laser is within the range defined by angle "C". Therefore, the reflecting member 68 makes judicious use of the potentially blocked signal by directing it at second different angle "B" so that this lost period of rotation of the signal is made useful.

The directing means 46 further includes a bracket 82 and a plurality of fasteners of any suitable conventional type capable of connecting the reflecting member 68 to the carrier assembly 67 at the predetermined location so that the light beam is reflected thereby at angle "B" and the reflected light beam is directed thereby to the scanning mirror 60. The bracket assembly 82 locates the reflecting member 68 between the axis 44 and the lift mast assembly 26 and in a crossing relationship with the plane 72 which lies along the longitudinal vehicle axis 14.

With reference to FIG. 3, the receiving means 48 includes a light sensor 76 which preferably comprises a photo diode which is connected to the frame 12 and specifically the spindle 64. The light sensor 76 is located on the spindle 64 and within the path of reflection of the reflected light beam signals from first and second targets 78,74 positioned within a facility 80 in which the vehicle 10 operates. Specifically, the reflected light from the first and second targets 78,74 is directed by the scanning mirror 60 to the light sensor 76. It should be noted that the light reflected from the first targets 78 will be received directly by scanning mirror 60 and reflected to the light sensor 76, and the light reflected from the second targets 74 will be directed by the reflecting member 68 toward the scanning mirror 60 and then by the scanning mirror 60 to the receiving means 48. It is to be mentioned that the load carrying apparatus 25 is located beneath the light beam signal directed at the second preselected angle "B".

The receiving means 48, upon receipt of a reflection the light beam signal, delivers a position signal. The navigation system 86 also includes a computer means 88, mounted on the vehicle frame 12 within the tower portion 16, for receiving each of the position signals delivered from the receiving means. The computer means 88 calculates, using these position signals and by way of triangulation, the exact position of the vehicle 88. The computer means 88 also receives signals from the steering system (steering angle resolver) and drive system (drive wheel rotation position resolver) and determines from these signals the estimated position of the the vehicle 10 within the facility 80. The computer then compares the actual position of the vehicle with the estimated position of the vehicle and makes appropriate vehicle maneuvers when the magnitude of deviation between the estimated and actual positions are greater than a maximum amount. When a correction is required the computer means 88 sends signals to the steering and drive systems (both not shown) to make the proper corrections. When only one target is in range of the laser scanning device 42 triangulation calculations may not be made however, the information received, the angle of location of the target relative to the vehicle 10 and the distance therefrom, is utilized by the computer means 88 in verifying that the sensed position of the vehicle by the onboard guidance system sensors is within tolerances.

The plurality of first targets 78 are positioned at preselected spaced apart locations within the facility 80 of operation of the self guided vehicle 10 and at a first preselected elevational distance "F" from the surface upon which the vehicle operates so that light beam signals delivered at the first preselected angle "A" are reflected by the first target 78 when located within the range of the light beam signal. The plurality of second targets 74 are mounted at spaced apart locations within the facility 80 and at a third elevational distance "G" spaced from the underlying surface. Distance "G" is preferably greater in magnitude than distance "F". The light beam signal delivered at the first preselected angle "A" relative to the axis of rotation is at a first preselected minimum vertical distance "E" from the underlying surface 96 and the second vertical distance "F" is greater in magnitude than the first vertical distance "E". The location of the first and second targets 78,74 is recorded on a map in the hereinafter to be discussed computer means 88, and used for comparison purposed to determine if the actual position of the vehicle 10 is at the desired location. The spaced apart distance of the first and second targets 78,74 is a function of the range of laser signaling device 42 and the receiving means 48.

The second targets 74 which are preferably mounted overhead of the normal travel paths of the SGV and between aisle areas defined by rows of densely stacked containers 90 such as cartons, boxes, palletized material, and the like. The second targets 74 provide reflected position signals in situations wherein the light beam signal directed at the first angle "A" is blocked by the cartons 90 from reaching first targets 78 within range. The second targets 74 receive light beam signals delivered at the second preselected angle "B" and reflect the light beam signals back to the reflecting member 68 and ultimately the receiving means 48. The reflections of the light beam signals from either the first and second targets 78,74 are received by the receiving means 48 which in turn delivers a position signal to the onboard computer means 88. Each target 78,74 preferably has an identification code of some sorts such as a bar code recorded thereon which identifies its specific location.

As previously discussed, this information is disseminated by a computer means 88 and through triangulation the onboard computer means 88 is able to determine the exact location of the vehicle within the facility 80. This information is compared to the information delivered to the computer means 88 by the guidance systems located on the vehicle. If there is a discrepancy between the two the information received from the bar coded targets takes priority over the onboard guidance system used for dead reckoning purposes. Thus, it can be seen that the second targets will provide a check during long runs within narrow aisles in which the first targets are blocked from the laser signaling device 42. The bar codes 92 of the first and second targets 78,74 are provided by spaced apart retroreflective stripes with dark nonreflective regions there between.

Figure 4:
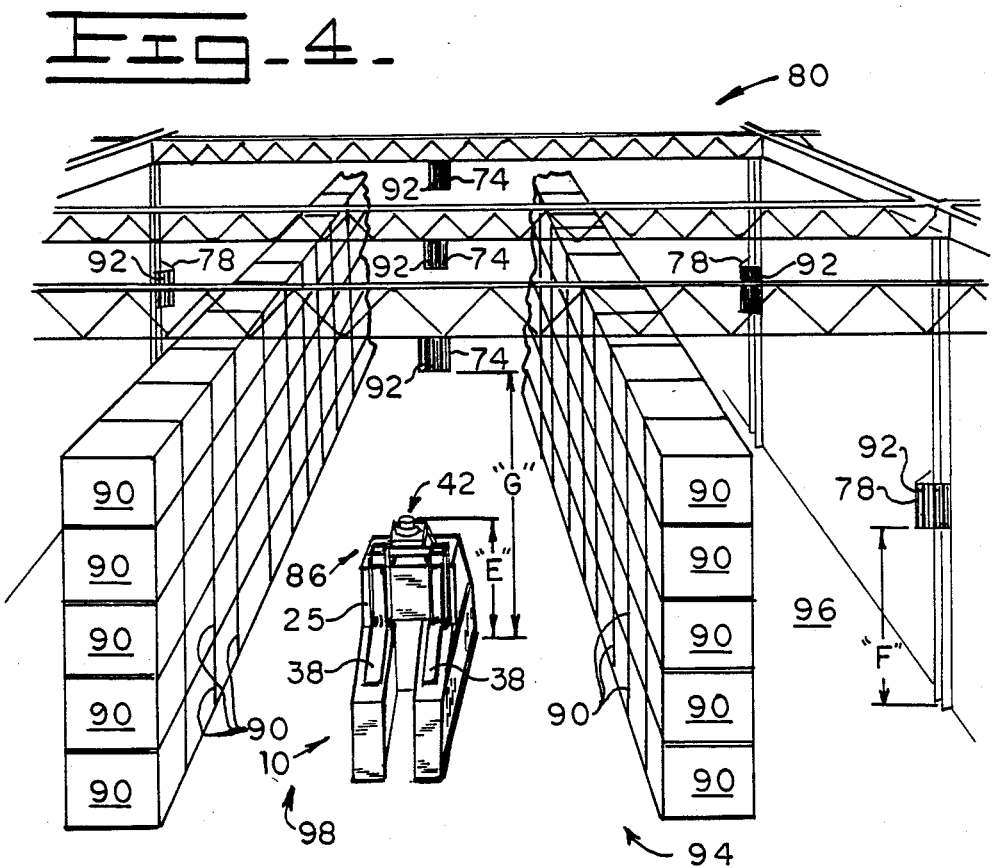
FIG. 4 is a diagrammatic isometric view of an automatic storage/retrieval system showing a self guided vehicle of FIG. 1 located between two rows of densely highly stacked containers, a plurality of first reflective targets located at a preselected vertical distance from the floor and a plurality of second reflective targets located at a different and higher vertical distance from the floor.

As best seen in FIG. 4 the self guided vehicle 10 is suitable for use in an automatic storage/retrieval system having spaced apart rows of densely stacked containers 90 which define an aisle 98 there between and the load carrying apparatus 25 is adapted to elevationally move selected containers 90 and transport the containers 90 on the underlying surface 96. It should be recognized that in such an automatic storage retrieval system 94 a plurality of self guided vehicles 10 may be provided to pick up, transfer, and deposit containers between storage, shipping, and manufacturing areas of the facility 80. The second targets 74 eliminate the potential of the SGV to deviate from its desired path of travel and insures that the forks 38 of the load carrying apparatus 25 may be accurately positioned relative to the container 90 to be lifted and transported.

Industrial Applicability

With reference to the drawings, and in operation the SGV 10 traverses the underlying surface 96 in accordance with preprogrammed instructions defining the path of travel the vehicle is to take and other information concerning the pick up and deposit of the containers 90. As the SGV 10 travels along the preprogrammed path the navigation system 86 reads the first bar coded targets 78 and delivers control signals to the onboard computer 88 which identifies through triangulation the location of the SGV relative to the first targets 78. The computer 88 compares this information to the information received by the onboard guidance system used for prearranging purposes and corrects the direction and travel of the self guided vehicle when the actual location of the SGV 10 deviates from the estimated location. Specifically, the laser signaling device delivers the light beam signal at the angle "A" as it rotates 360 degrees about axis 44. The light beam signal, when in range of the first target or targets 78, strikes the target or targets as it rotates, passes by, and the first target(s) return a coded reflected light signal from the bar coded first target(s). The receiving means 48 senses the coded returned light signal and delivers a position signal to the onboard computer means 88. The computer means 88 utilizes this information to calculate the actual position through triangulation, comparison with a map, and with reference to other signals received from the onboard guidance sensors.

When the SGV enters an aisle 98 between densely stacked containers 90 the light beam signal delivered by the laser signaling device 42 is blocked from the first targets 78 by the cartons 90 which makes it impossible for the SGV to verify its actual location within the facility 80. In situations wherein the distance of travel is short in length the free-ranging capabilities as provided by the onboard guidance system is satisfactory. However, when the distance of travel is great, such as in long rows of stacked containers 90, the need for actual location confirmation is desirable.

The directing means 46 provides a solution to the problem of operating in dense rows by directing the delivered light beam signal, during a preselected portion of the rotation of the laser signaling device 42, at a second different preselected angle "B" relative to the axis of rotation 44 of the laser signaling device, reading a plurality of second bar coded targets 74, located at an elevational location higher than the first targets and above the SGV 10, and directing the reflected light beam signals from the second targets 74 to the receiving means, and delivering location signals to the onboard computer 88. The second targets 74 being preferably located between and equidistantly spaced from adjacent rows of stacked containers which will provide the maximum amount of tolerance for vehicle deviation from the desired path of travel. It is to be emphasized that the position of the reflecting member 68 of the directing means 46 is at a dead-band location on the SGV 10 at which the light beam delivered at the first angle "A" would be blocked by the lift mast assembly 26. Therefore, the accuracy and operation of the laser signaling device 42 for reading the first targets 78 is maintained.

Because the SGV 10 is able to frequently check its location relative to the first and second targets 78,74 the accuracy of performance and load pickup and deposit is maximized.

Other aspects objects and advantages of the present invention can be obtained from a study of the drawings, the disclosure and the appended claims.

I claim:

1. A self guided material handling vehicle having a longitudinal axis, a frame and a load carrying apparatus mounted on the frame, said self guided vehicle being adapted to navigate along an underlying surface in response to instructions stored in an onboard computer based on information received from a plurality of first and second elevationally and transversely spaced apart targets, comprising:
   a laser signaling device mounted on the frame and rotatable about an axis of rotation extending in an elevational direction generally perpendicularly to the longitudinal axis, said laser signaling device being adapted to deliver a light beam signal at a first preselected elevational angle relative to the axis of rotation, and said first targets being adapted to reflect the light beam signal delivered at the first angle;
   means for directing the delivered light beam signal, during a preselected portion of said rotation and during each revolution of the laser signaling device, at a second different preselected elevational angle relative to the axis of rotation, said second targets being adapted to reflect the light beam signal delivered at the second angle, and said directing means being fixedly attached to the frame and static relative to the laser signaling device;
   means for receiving a reflection of said light beam signals and delivering a vehicle position signal in response to receiving a reflection of each light beam signal.

2. A navigation system for a self guided vehicle, having a frame, and a longitudinal axis, and being supportable on an underlying surface, comprising:

a laser signaling device mounted on the vehicle frame at a preselected elevational position and rotatable about an axis of rotation extending generally perpendicularly to said longitudinal axis, said laser signaling device being adapted to deliver a light beam signal at a first preselected angle relative to said axis of rotation during each revolution of the laser signaling device about said axis;

means for directing the delivered light beam signal, during a preselected portion of each revolution of the laser signaling device, at a second different preselected angle relative to said axis of rotation, said directing means including a reflecting member having a preselected length and being fixedly mounted on the frame at a preselected location radially spaced from the axis of rotation of said laser signaling device and at a preselected angle relative to the axis of rotation lying in a plane of the axis of rotation passing through said reflecting member, said reflecting member lying in the path of the light beam signal at the first preselected angle and said preselected length establishing the angular magnitude of the preselected portion of rotation at which said light beam is delivered at said second preselected angle;

a plurality of first targets positioned at preselected spaced apart locations and at substantially equal elevational distances from the underlying surface, said first targets being adapted to deliver a reflection of the light beam signal delivered at said first preselected angle;

a plurality of second targets positioned at preselected spaced apart locations and at substantially equal elevational distances from the underlying surface, said second targets being spaced both elevationally and transversely from the first targets and adapted to deliver a reflection of the light beam signal directed at said second angle;

means for receiving said reflections of the light beam signals delivered at said first and second angles and delivering a position signal in response to receiving any one of said light beam reflections; and computer means for receiving said position signal and correcting the direction of travel of said self guided vehicle in response to preprogrammed instructions.

3. A navigation system, as set forth in claim 2, wherein said reflecting member has an arcuate surface of a preselected average chordal length, said arcuate surface being radially spaced from the axis of rotation of said laser and at a preselected angle relative to said axis of rotation lying in a plane of the axis of rotation passing through said arcuate surface.

4. A navigation system, as set forth in claim 3, wherein said laser signaling device has a scanning mirror connected to said frame and rotatable about the axis of rotation, said directing means being adapted to direct said reflected signal from said second targets toward said scanning mirror and said scanning mirror being adapted to direct said reflected signals from said first and second targets toward said receiving means.

5. A navigation system, as set forth in claim 3, wherein said laser signaling device has a scanning mirror rotatably connected to said frame and a light beam signal emitting source connected to the frame at a location adjacent the scanning mirror, said light beam signal emitting source being adapted to produce a light beam signal and said light beam signal being directed toward the scanning mirror, said scanning mirror being adapted to deliver said light beam signal at said first angle relative to said axis of rotation.

6. A navigation system, as set forth in claim 2, wherein said frame of the self guided vehicle includes a first side and a second side spaced from the first side, said first and second sides extending longitudinally relative to the vehicle axis, and including a load carrying apparatus mounted on the frame within an area on the frame substantially between the first and second sides and beneath the light beam signal directed at said second preselected angle.

7. A navigation system, as set forth in claim 6, including a tower portion having an upper end portion, said reflecting member and said laser signaling device being mounted on the tower portion at said upper end portion, said reflecting member being positioned on the tower portion upper end portion between the laser signaling device and said load carrying apparatus.

8. A navigation system, as set forth in claim 6, wherein said load carrying apparatus includes a pair of spaced apart uprights mounted on the frame and a carriage assembly mounted on and movable along the uprights, said uprights extending substantially perpendicularly to said longitudinal axis and being movable along said longitudinal axis.

9. A navigation system, as set forth in claim 8, wherein said reflecting member has an arcuate surface having a preselected average chordal length, said arcuate surface being radially spaced from the axis of rotation of said laser signaling device and at a preselected angle relative to the axis of rotation lying in a plane of the axis of rotation passing through said arcuate surface.

10. A navigation system, as set forth in claim 2, wherein said laser signaling device has a scanning mirror rotatably connected to the frame and a light beam signal emitting source connected to the frame at a preselected location adjacent the scanning mirror, said light beam signal emitting source being adapted to direct said light beam signal toward the scanning mirror and said scanning mirror being adapted to deliver said light beam signal at said first angle relative to said axis of rotation.

11. A navigation system, as set forth in claim 10, wherein said scanning mirror is adapted to direct the reflection of the light beam signals toward said receiving means.

12. A navigation system, as set forth in claim 11, wherein said receiving means includes a photo-diode connected to the frame at a location on the frame in a path of the directed reflected light beam signals.

13. A navigation system, as set forth in claim 2, wherein said second targets are spaced at a higher elevational position than the first targets and elevationally above said laser signaling device.

14. A navigation system as set forth in claim 13, wherein each of said first and second targets are retroreflective and each have a bar code identifying the location of the target.

15. An automatic storage/retrieval system having a self guided vehicle and at least two spaced apart rows of densely stacked containers defining an aisle therebetween, said self guided vehicle having a frame, a longitudinal axis, and a load carrying apparatus mounted on the frame and adapted to elevationally move selected ones of said containers, said self guided vehicle being supported on and moveable along an underlying surface, comprising:

a laser signaling device mounted on the vehicle frame and rotatable about an axis of rotation extending generally perpendicularly to said longitudinal axis, said laser signaling device being adapted to deliver a light beam signal at a first preselected angle relative to said axis of rotation and at a first preselected minimum vertical distance from said underlying surface during each revolution of the laser signaling device about said axis;

means for directing the delivered light beam signal, during a preselected portion of each revolution of the laser signaling device, at a second different preselected angle relative to said axis of rotation, said directing means including a reflecting member having a preselected length and being fixedly mounted on the frame at a preselected location radially spaced from the axis of rotation of said laser signaling device and at a preselected angle relative to the axis of rotation lying in a plane of the axis of rotation passing through said reflecting member, said reflecting member lying in the path of the light beam signal at the first preselected angle and said preselected length establishing the angular magnitude of the preselected portion of rotation at which said light beam is delivered at said second preselected angle;

a plurality of first targets positioned at preselected spaced apart locations and at a second preselected vertical distance from the underlying surface, said first targets being adapted to deliver a reflection of the light beam signal delivered at said first preselected angle;

a plurality of second targets positioned at preselected spaced apart locations and at a third preselected vertical distance from the underlying surface, said third vertical distance being greater in magnitude than the first and second vertical distances and said second targets being spaced from said first targets, said second targets being adapted to deliver a reflection of the light beam signal directed at said second angle;

means for receiving said reflections of the light beam signals delivered at said first and second angles and delivering a position signal in response to receiving one of said reflections; and means for receiving said position signal and controlling navigation of said self guided vehicle in response to preprogrammed instructions.

16. An automatic storage/retrieval system, as set forth in claim 15, wherein said reflecting member has an arcuate surface of a preselected average chordal length, said arcuate surface being radially spaced from the axis of rotation of said laser and at a preselected angle relative to said axis of rotation lying in a plane of the axis of rotation passing through said arcuate surface.

17. An automatic storage/retrieval system, as set forth in claim 15, wherein said plurality of first and second targets are retroreflective and the magnitude of said second vertical distance is greater than the magnitude of said first distance.

18. An automatic storage/retrieval system, as set forth in claim 17, wherein said second targets are located between the first and second rows of densely stacked containers.

* * * * *